INVENTOR.
EDWARD LEVY MAYO.
ATTORNEYS

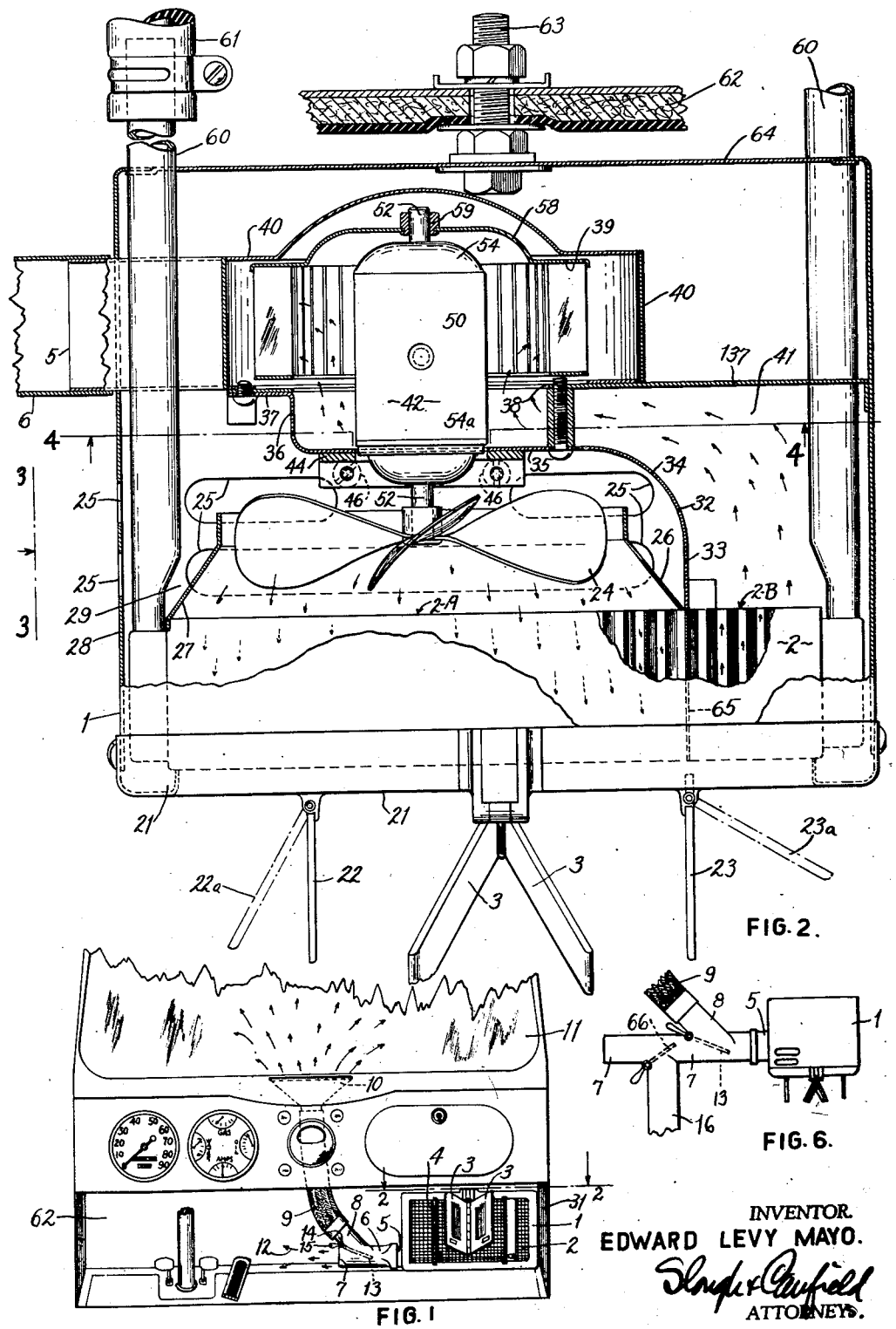

Patented June 15, 1943

2,322,041

UNITED STATES PATENT OFFICE 2,322,041

AUTOMOTIVE VEHICLE HEATING APPARATUS

Edward Levy Mayo, Cleveland, Ohio, assignor to The Bishop & Babcock Manufacturing Company, Cleveland, Ohio, a corporation of Ohio Application March 28, 1936, Serial No. 71,466

13 Claims. (Cl. 257—137)

This invention relates to heaters for automotive vehicles and particularly to those in which air is blown through a liquid heated radiator.

Among the objects of the invention are:

To provide an improved heater of the type referred to;

To provide a vehicle heater of the class referred to having improved means for heating air and forcing it along flow directing conduit means to a plurality of points in the vehicle for applying it to various uses;

To provide an improved vehicle heating apparatus of the class referred to for concurrently or alternatively blowing heated air into the passenger compartment of the vehicle, and upon the vehicle windshield to defrost it;

To provide an improved vehicle windshield defrosting apparatus; and

To provide an improved vehicle interior heating apparatus.

Other objects will be apparent to those skilled in the art to which my invention appertains.

My invention is fully disclosed in the following description, taken in connection with the accompanying drawings, in which:

Fig. 1 is an elevational view, taken from within the passenger compartment of an automotive vehicle, looking forwardly toward the windshield, and illustrating, in elevation, an embodiment of my invention;

Fig. 2 is a view, on a larger scale, with parts broken away and shown in section, taken approximately on the plane of the line 2—2 of Fig. 1;

Fig. 6 is a more or less diagrammatic view illustrating another embodiment of my invention.

Figure 3:
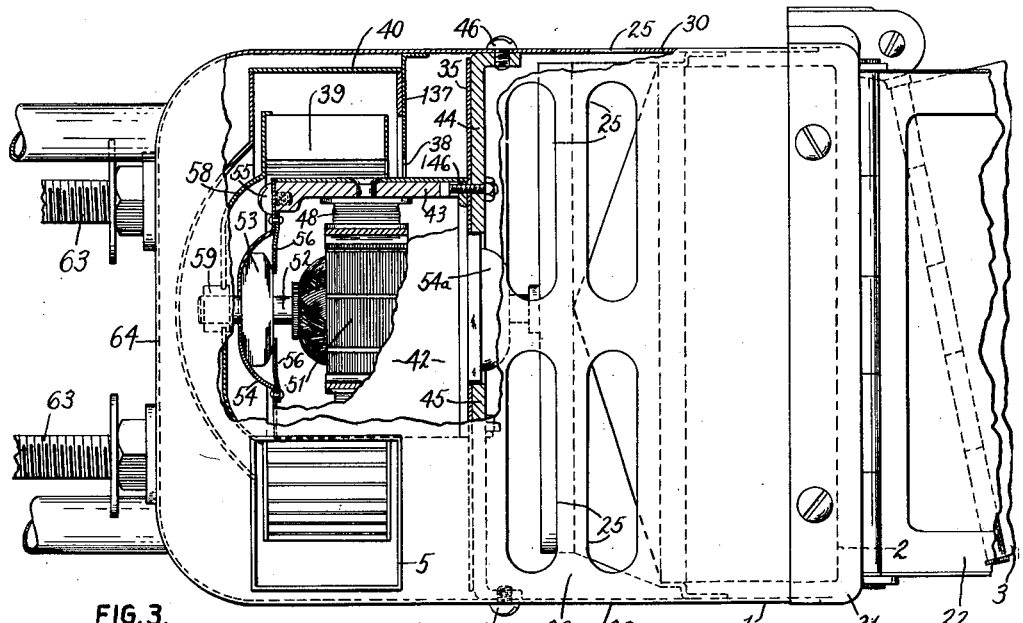
Fig. 3 is a side elevational view taken on the plane of the line 3—3 of Fig. 2, with parts broken away and shown in section.
Figure 4:
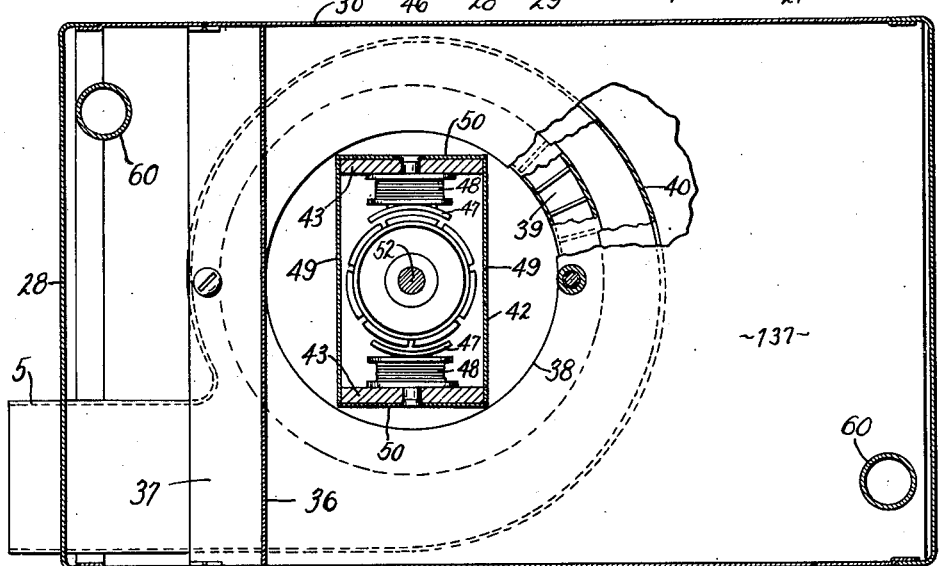
Fig. 4 is a sectional view taken approximately on the plane of the line 4—4 of Fig. 2.

Referring to the drawings, I have shown generally at 1 a casing or housing having at the front thereof a liquid heated radiator, indicated generally at 2, outwardly through which heated air is blown to heat the passenger compartment of the automotive vehicle under the control of doors 3—3 and 4 and laterally from which extends an outlet conduit 5 through which heated air is blown. In the embodiment of my invention as illustrated in Figs. 1 to 4 inclusive, the outlet conduit 5 has telescoped thereover a distributor conduit 6 having a branch opening at its end, as at 7, into the passenger compartment, and having a branch conduit 8 which is connected by a hose 9 to a nozzle 10 having a slitlike outlet disposed preferably at the base of the windshield 11.

Heated air, which is blown out of the open end 7 of the distributor conduit 6 as indicated by the arrows 12, is blown toward and upon the feet of the vehicle driver when his feet are in their normal position on the accelerator or pedals, and the air which is blown upwardly through the hose 9 and out of the nozzle 10 sufficiently warms the surface of the windshield 11 to defrost the same or to prevent the formation of frost or moisture condensation thereon in a well-known manner; the relative amount of hot air blown in the said two directions may be regulated by a valve 13 hinged at 14 and operable by a handle 15, extreme movement of the valve or damper 13 upwardly, as viewed in the drawings, shutting off flow through the branch conduit 8, and extreme movement downwardly shutting off flow out of the outlet conduit at 7.

Figure 5:
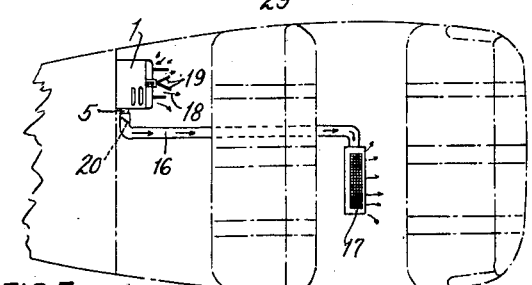
Fig. 5 is a diagrammatic view illustrating, in plan, an automotive vehicle with a modification of my invention applied thereto.

In the modification of Fig. 5, the outlet conduit 5 discharges into a conduit 16 leading to the rear portion of the passenger compartment and discharging thereinto out of a suitable grilled register 17 which may be disposed at the floor of the car and in front of the rear seat; in this form, as will now be clear, heated air is discharged out of the casing 1, as indicated by the arrow 18, into the forward portion of the passenger compartment, and as indicated, heated air is also discharged out of the register 17 into the rear portion of the passenger compartment, and the relative amounts thereof may be regulated by the doors 19 and a throttle valve 20 in the line of flow through the conduit 16.

The apparatus by which the above described operation and applications of heated air may be effected will now be described, but, at this point, it may be stated that the doors 3—3 and the mounting therefor, by which they may be set at different angles with the face of the radiator tubes or moved bodily outwardly and upwardly around an upper hinge, forms no essential part of the present invention, such construction being the subject matter of the Findley U. S. Patent 2,024,440, dated December 17, 1935, and reference may be had thereto for a fuller description.

At the front side or face of the radiator, the casing is provided with a cover frame 21, and the doors 3—3 are supported on the frame and disposed to adjustably cover the central part of the radiator; doors 22 and 23, hinged upon the frame 21, are disposed to adjustably cover the lateral portions (the left-hand and right-hand portions as viewed in Figs. 1 and 2) of the radiator. In the drawings, Fig. 2, the doors 22 and 23 are illustrated in their wide open position and the doors 3 in approximately the half-open position, the doors 22 and 23 being movable to adjusted positions such as those illustrated at 22a and 23a respectively.

The radiator, while preferably being made all as one unit, is utilized in and may be considered in two parts, a part 2A and a part 2B side by side as viewed in Fig. 2. A fan or blower 24, supported and driven in a manner to be described, is provided to draw air into the casing 1 through inlet ports 25—25 and force it through the radiator part 2A and out, under the control of the doors 3—3 and 22.

A sheet metal cowl 26 surrounds the fan 24 and flares forwardly therefrom, as at 27, joining at its periphery with the inner face of the radiator. The inlet ports 25—25 are preferably in the form of slots in one side wall 28 and in the bottom wall 29 and top wall 30 of the casing, the opposite side wall preferably having no perforations therein whereby that wall may be disposed close to the adjacent wall of the passenger compartment as illustrated in Fig. 1 at 31.

The incoming air is directed, on its way from the intake ports 25 to the cowl 26 by a vertical wall of sheet metal 32, the wall being secured to the top and bottom casing walls 30 and 29 respectively and, in horizontal cross-section, having the configuration shown in Fig. 2; that is to say, extending rearwardly as at 33 from the radiator inner face, then curving as at 34 into parallelism with the radiator face as at 35, the portion 35 lying behind and spaced from the fan 24 and terminating in a rearwardly extending portion 36 and a transverse foot 37. The air entering the ports 25 and flowing to and through the radiator is thus constrained to flow through the part 2A thereof which is isolated from the part 2B of the radiator by the said wall 32.

Another transverse wall 137, preferably made of sheet metal, extends transversely across the casing interior, spaced rearwardly from the portion 35 of the wall 32 above described, and has, substantially co-axial with the fan 24, a large opening 38 therein. A centrifugal blower rotor 39, rotatably supported and driven in a manner to be described, is provided on the rearward side of the wall 137, concentric with the opening 38, and is enclosed within a blower housing 40 of the usual form increasing in radius toward its outlet, which is the above referred to outlet conduit 5 as is plainly shown in Figs. 2 and 4.

Upon rotation of the rotor 39, air is drawn inwardly into the casing through the radiator part 2B and into the chamber 41, formed by and between the said walls 32 and 137, and is directed through the opening 38 centrally into the blower rotor 39, being then forced outwardly into the blower housing 40 and sent out at the outlet conduit 5 which extends through the casing wall.

The fan 24 and blower rotor 39 are both driven by a motor shown generally at 42 and, while this motor may be variously constructed and operated from various sources of energy, such as electric, vacuum, compressed air, etc., I prefer to employ the electric motor construction illustrated in the drawings and which will now be described.

A pair of opposite motor yoke pieces 43—43, vertically spaced apart, are secured at their forward ends to brackets respectively depending from and extending upwardly from the upper wall 30 and lower wall 29 of the casing, as shown at 44 and 45, the brackets having feet at their wall eingaging ends secured to said respective walls by means such as screws 46—46, and the yoke pieces 43—43 being secured to the brackets by bolts, as shown at 146, projected through the brackets and into the pieces. The brackets 44 and 45 may be made of relatively heavy metal and the said wall portion 35 may be secured thereto by spot-welding or the like on the rearward side thereof, as shown in Figs. 2 and 3, to rigidly support said wall portion.

Opposite field poles 47—47 and field winding 48—48 are secured to the inner sides of the yoke pieces 43—43.

The yoke pieces 43—43 are joined by opposite walls 49—49 of a box-form casing which may have upper and lower walls 50—50 superposed on the yoke pieces 43—43, the walls 49—49 preferably being made of ferrous sheet metal to complete the magnetic circuit for the field. The motor armature 51 rotates between the field pieces 47—47 in the usual manner and is supported on a shaft 52 rotatably supported in bearing elements, one of which is shown at 53. The bearing element 53 is supported in a cup-like stamping 54 secured at the upper and lower portions thereof to the yoke pieces 43, 43 by a screw or screws, such as 55, Fig. 3, the bearing element 53 being centered in the bottom of the cup and retained therein by flat springs 56—56 secured to the stamping 54. At the forward end of the yoke pieces 43—43, there is provided a similar stamping 54a, in which is seated and secured another bearing element, not shown, which may be like the bearing element 53, and the shaft 52 is thus rotatably supported at these spaced points. The bearing element 53 may be ball bearing.

The shaft 52, projecting forwardly from the motor, has the fan 24 secured thereto and, projecting rearwardly from the motor, has the blower rotor 39 secured thereto, the blower rotor having a rearwardly extending cupped central portion 58 having at the center of its cupped bottom a bored head 59 secured to the end of the shaft 52.

As will now be apparent, both the fan 24 and the blower rotor 39 are secured to the one motor armature shaft 52 and, upon energization of the motor in the usual manner, two independent and relatively isolated flows of air are induced, one forwardly through and out of the radiator portion 2A and the other inwardly through the radiator portion 2B and out of the lateral outlet conduit 5, the entire apparatus being enclosed within a sheet metal casing.

As stated above, the radiator may be of usual construction supplied with hot liquid through conduits 60—60 projecting rearwardly out of the casing and adapted to be connected by hose lines, such as 61, to the cooling circulating system of the vehicle engine.

The casing may be mounted upon the vehicle fire-wall, indicated at 62, Fig. 1 and Fig. 2, by bolts 63—63 secured at one end to the rear casing wall 64 and having means thereon for clamping or otherwise securing the bolts 63 to the fire-wall 62.

As will be apparent, by closing the door 23, Fig. 2, the supply of air to the lateral outlet conduit 5 will be shut off and the same may be regulated by adjusting the position of the door 23. In a similar manner, the flow of air forwardly from the radiator may be controlled by adjustably positioning the doors 3—3 and 22.

The division of the radiator into the two parts 2A and 2B will, in the normal construction of radiators of the cellular type, be effected by merely engaging the forward edge of the wall portion 33 with the inner face of the radiator, but, if desired, the radiator may further be divided by a partition element indicated at 65, Fig. 2.

As described above in connection with Fig. 1, the lateral air outlet at 5 may supply air to the windshield for defrosting purposes or to the immediate car interior; and in the form of Fig. 5, the air may be supplied from the lateral conduit 5 to heat the rearward portion of the vehicle interior. It will also be clear from the showing of Fig. 6 that all of these alternative uses may be embodied in a single system, the valve 13 alternatively directing the flow from the casing 1 to the windshield hose 9 or to the lateral vehicle interior heating outlet 7, and a second valve 66 alternatively directing the flow out at the lateral outlet 7 or through the duct 16 to heat the rearward part of the vehicle interior; and the valves 13 and 66 may divide the flow in any desired proportion between the ducts which it may alternatively supply. Of course, it will be understood that for any position of the valves 13 and 66, heated air will be blown out from the casing 1 directly into the forward part of the passenger compartment.

My invention is not limited to the exact details of construction illustrated at this time. Many changes and modifications may be made within the spirit of my invention and within the scope of the appended claims.

I claim:

1. In a fluid-heated type heater for the passenger compartment of automotive vehicles, a fluid-heated radiator core having a plurality of air heating passages each communicating at its two ends respectively with the interior and exterior of a casing, a pair of air impellers within the casing, one adapted to discharge a relatively large flow of air from the casing to the compartment through a relatively large number of said passages, the other impeller adapted to draw another supply of air through a relatively smaller number of other of said passages to the interior of said casing, a wall of the casing providing an inlet port for air supply to the first impeller, a casing wall providing also a port for discharging the air operated upon by the second impeller from the casing, said second impeller being relatively so disposed and formed as to effect a greater difference in air pressures on its approach and discharge sides than said first impeller, said casing comprising conduits and said passages and ports being substantially comprised in two separate sets of serially related ducts, each set separately conducting air impelled by a different one of said impellers into and from the casing, under different air-flow inducing pressures, and a common motor adapted to simultaneously operate both said impellers.

2. In a fluid-heated type heater for heating different portions of a compartment, the combination with a ported heater casing, a motor in the casing comprising a rotary motor shaft, a pair of air-flow inducing impellers adapted for rotation by said shaft, one of said impellers being substantially of the well-known fan type adapted to impel air in a relatively generally axial direction, the other impeller being of the well-known centrifugal type whereby it is adapted to relatively better induce a rapid flow of air under relatively higher pressure through more restricted passages, conduit means providing a pair of separate air introducing and discharging passages for each of said impellers to communicate air to each of said impellers from the compartment exteriorly of the casing to an associated one of said impellers within the casing and to receive air from said associated impeller and, to discharge such air therefrom and from the casing, air heating means associated with the casing, the discharge portion of the conduit for said fan type impeller comprising heated surfaces of said air heating means, and the air introducing passage for the centrifugal type impeller comprising different heated surfaces of said air heating means.

3. In a fluid-heated type heater for the passenger compartment of automotive vehicles, a fluid-heated radiator core having a plurality of air heating passages each communicating at its two ends respectively with the interior and exterior of a casing, a pair of air impellers within the casing, one adapted to discharge a relatively large flow of air from the casing to the compartment through a relatively large number of said passages, the other impeller adapted to draw another supply of air through a relatively smaller number of other of said passages to the interior of said casing, a wall of the casing providing an inlet port for air supply to the first impeller, a casing wall providing also a port for discharging the air operated upon by the second impeller from the casing, said second impeller being relatively so disposed and formed as to effect a greater difference in air pressures on its approach and discharge sides than said first impeller, said casing comprising conduits and said passages and ports being substantially comprised in two separate sets of serially related ducts, each set separately conducting air impelled by a different one of said impellers into and from the casing, under different air-flow inducing pressures, a common motor adapted to simultaneously operate both said impellers, a heated air dispensing element disposed remotely from said casing, and a conduit extending between said dispensing element and the discharge port of the casing for said second impeller.

4. In a fluid-heated type heater for heating different portions of a compartment, the combination with a ported heater casing, a motor in the casing comprising a rotary motor shaft, a pair of air-flow inducing impellers adapted for rotation by said shaft, one of said impellers being substantially of the well-known fan type adapted to impel air in a relatively generally axial direction, the other impeller being of the well-known centrifugal type whereby it is adapted to relatively better induce a rapid flow of air under relatively higher pressure through more restricted passages, conduit means providing a pair of separate air introducing and discharging passages for each of said impellers to communicate air to each of said impellers from the compartment exteriorly of the casing to an associated one of said impellers within the casing and to receive air from said associated impeller and to discharge such air therefrom and from the casing, air heating means associated with the casing, the discharge portion of the conduit for said fan type impeller comprising heated surfaces of said air heating means, the air introducing passage for the centrifugal type impeller comprising different heated surfaces of said air heating means, a heated air dispensing element disposed remotely from said casing, and a conduit extending between said dispensing element and a discharge port of the casing in communication with the discharge passage for said centrifugal type impeller.

5. In an apparatus of the class described, the combination of a casing, means for supporting the same within the body of an automobile, a radiator mounted in said casing, means whereby said radiator may be connected with the hot water circulating system of said automobile, a duct carried by said casing and leading to a point adjacent the windshield of said car, discharge openings in said casing adjacent said radiator, and means within said casing for propelling air through said radiator and said discharge openings into the body of the car, and simultaneously propelling a portion of the air which is passed through said radiator through another portion of said radiator and thence through said duct.

6. In an apparatus of the class described the combination in an automobile heater having means for heating air and for circulating it through the body of the car, of means for further heating a portion of said air heated by said first-mentioned means, and discharging the same against the surface of the windshield of said car.

7. In an apparatus of the class described the combination in an automobile heater having means for heating air and for circulating it through the body of the car, of means for further heating a portion of said air heated by said first-mentioned means, and discharging the same against the surface of the windshield of said car, said means comprising an auxiliary heating surface, a duct leading from said surface to a point adjacent said windshield, and means for impelling air from said first named heater in contact with said auxiliary surface and through said duct into contact with the windshield.

8. A heater comprising, a heating radiator, means for guiding air through the radiator in separate paths, a fan of the axial delivery type for forcing air through one path, a fan of the radial delivery type for forcing air through another path, and a single motor operating both air forcing means.

9. A heater comprising, a heating radiator, means for guiding air through the radiator in separate paths, means for forcing air through one path, means for forcing air through another path, and a single motor operating both air forcing means, one of the paths being of substantially less area than the other, and its air forcing means being adapted to force air at a substantially higher pressure than the other air forcing means.

10. In a fluid-heated type heater for the passenger compartment of automotive vehicles, a fluid-heated radiator core having a plurality of air heating passages therethrough, a pair of air impellers, one being adapted to circulate a relatively large flow of air through a relatively large number of said passages, the other impeller being disposed to draw air through a relatively small number of said passages and being provided with a housing having an inlet port and a discharge port, said second impeller being relatively so disposed and formed as to effect a greater difference in air pressures on its approach and discharge sides than said first impeller, means for defining different air flow paths for said respective impellers, and a common motor adapted to simultaneously operate both said impellers.

11. An automobile heater comprising a unitary framework adapted to be mounted in the passenger compartment, a radiator carried by said framework, connections for said radiator whereby hot water may be circulated therethrough, a motor mounted on said framework, a centrifugal blower carried on the shaft of said motor, a housing for said blower carried by said framework, a conduit leading from a relatively small area of said radiator to the central portion of said housing for conducting heated air from the former to the latter, a restricted peripheral outlet for said housing, a conduit leading from said outlet whereby said heated air may be discharged from said housing at relatively high pressure for conveyance to a relatively small area, and a fan of the propeller type also carried on said shaft of said motor, said fan confronting a relatively large area of said radiator, whereby a relatively large volume of air is thereby circulated through said radiator for heating said passenger compartment.

12. An automobile heater comprising a unitary framework adapted to be mounted in the passenger compartment, a radiator carried by said framework, connections for said radiator whereby hot water may be circulated therethrough, a motor mounted on said framework, a centrifugal blower carried on the shaft of said motor, a blower scroll housing for said blower carried by said framework, means for admitting air which has passed through said radiator to the central portion of said housing, a restricted outlet for and exclusive to said housing and a conduit leading from said outlet, whereby said air may be discharged from said housing at relatively high pressure for conveyance to a relatively small area, and a fan of the propeller type also carried on said shaft of said motor, said fan confronting a relatively large area of said radiator, whereby a relatively large volume of air is thereby circulated at relatively low pressure through said radiator for heating said passenger compartment.

13. An automobile heater comprising a unitary framework adapted to be mounted in the passenger compartment, a radiator carried by said framework, connections for said radiator whereby hot water may be circulated therethrough, a motor mounted on said framework within the bounding planes thereof, a centrifugal blower element comprising blades carried on the shaft of said motor and operating in a blower scroll housing having a restricted outlet exclusive to itself, whereby air which has passed through said radiator and to said blades is discharged from said housing at relatively high pressure, a conduit for conveying said high pressure air from said outlet to a remote relatively small area, and a fan element comprising propeller blades carried on said shaft of said motor and confronting a relatively large area of said radiator, whereby a relatively large volume of air is thereby moved axially and circulated at relatively low pressure through said radiator for heating said passenger compartment.

EDWARD LEVY MAYO.

Disclaimer 2,322,041.—*Edward Levy Mayo*, Cleveland, Ohio. AUTOMOTIVE VEHICLE HEATING APPARATUS. Patent dated June 15, 1943. Disclaimer filed May 26, 1948, by the assignee, *The Bishop & Babcock Manufacturing Company*.

Hereby enters this disclaimer to claim 6 of said patent.

[*Official Gazette August 17, 1948.*]